Sept. 29, 1970     C. L. LeBLANC ET AL     3,531,188
FLIP-UP LENSES FOR SPECTACLES
Filed May 31, 1968     3 Sheets-Sheet 1
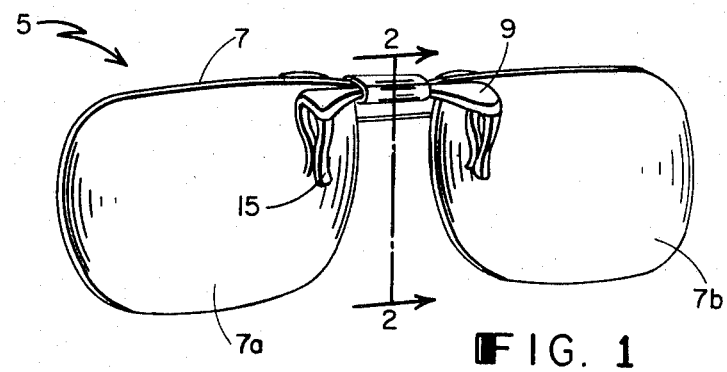
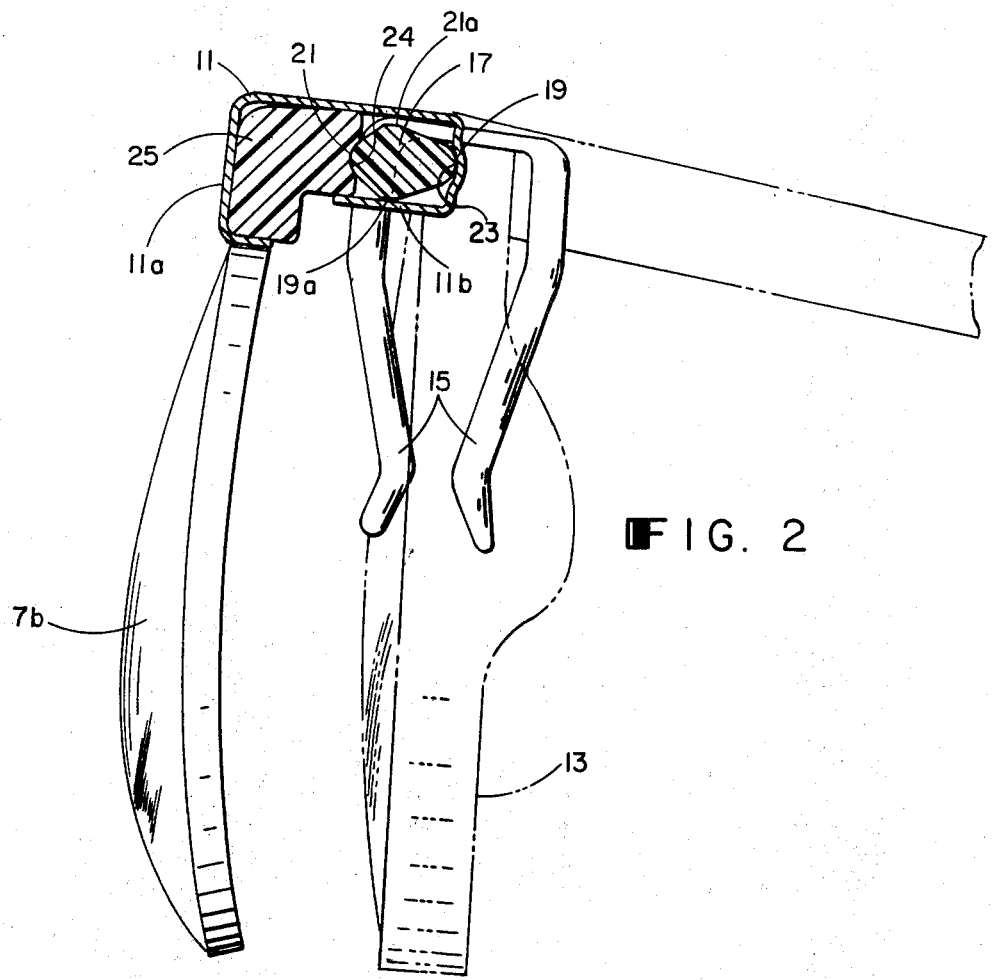
INVENTORS.
CONRAD L. LeBLANC
and JACK BLOCH
BY *Patrick L. Henry*
ATTORNEY.

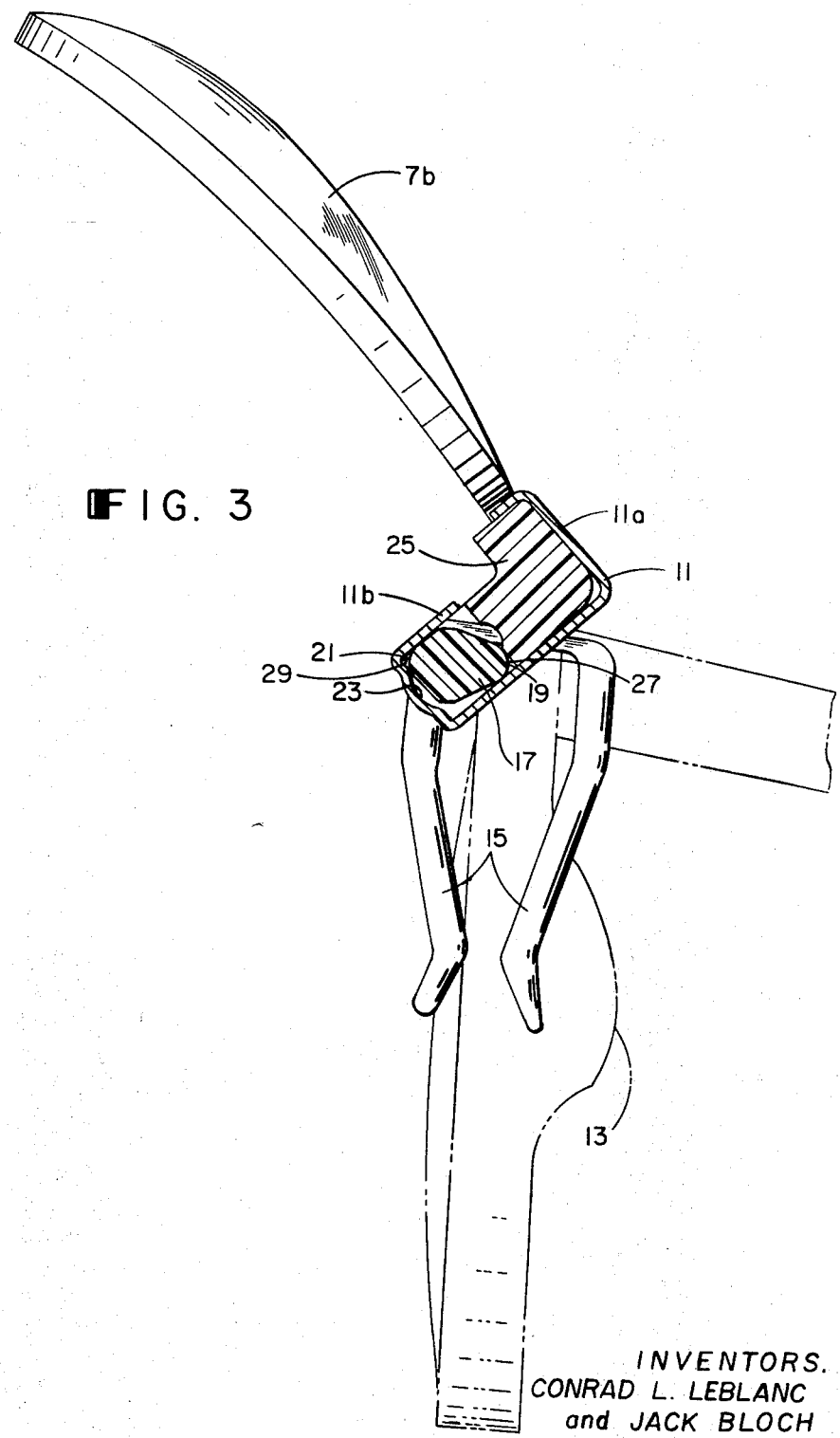

Sept. 29, 1970   C. L. LEBLANC ET AL   3,531,188
FLIP-UP LENSES FOR SPECTACLES
Filed May 31, 1968   3 Sheets-Sheet 3
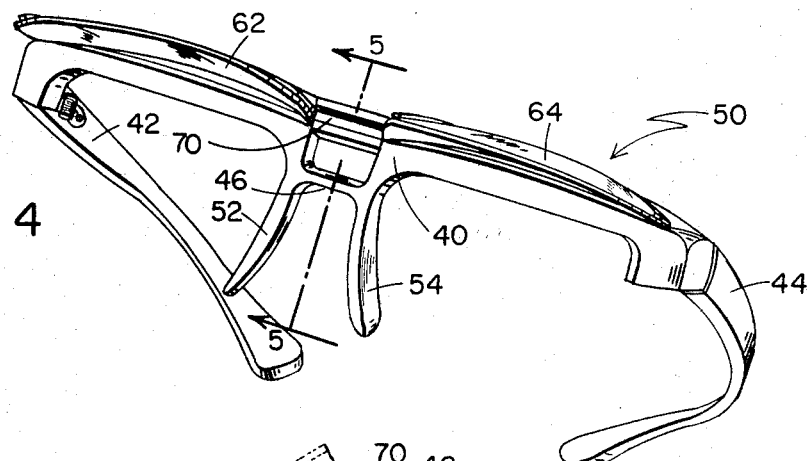
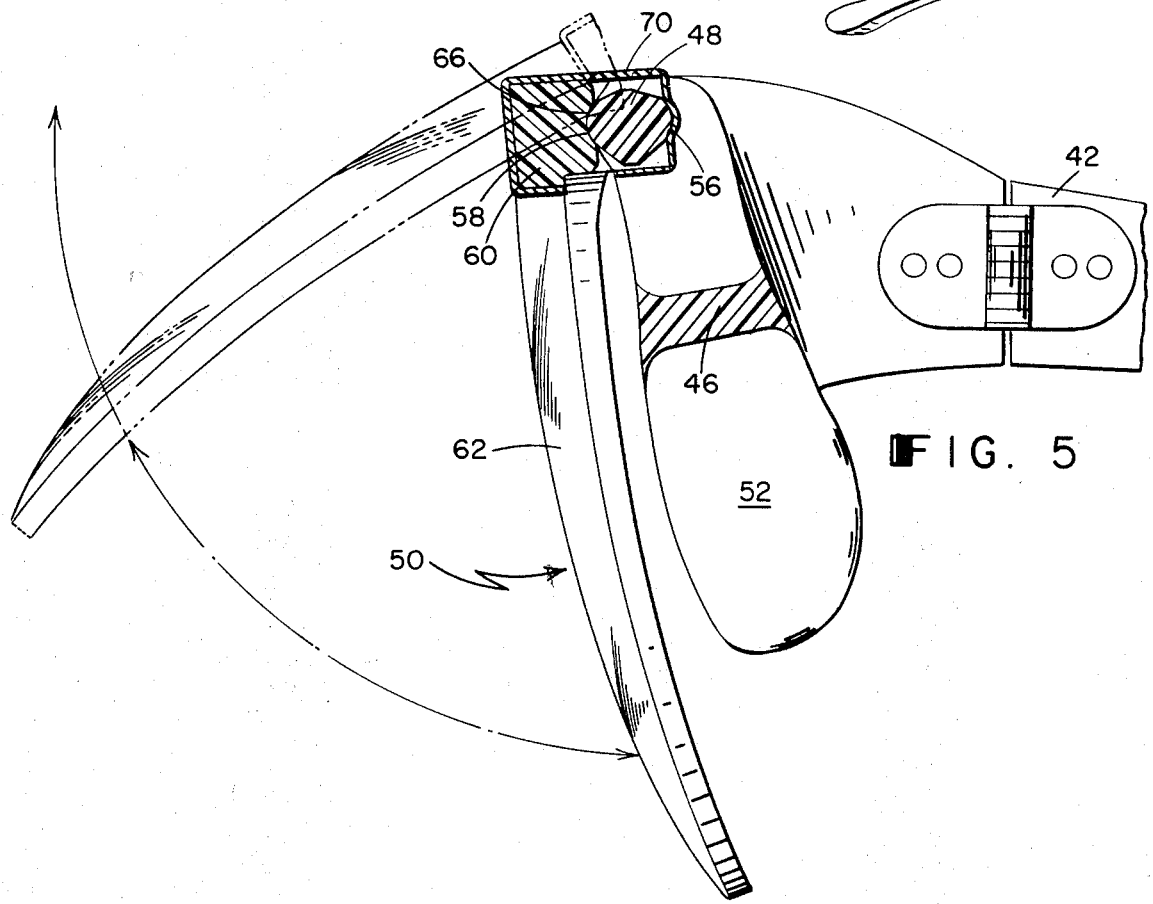
INVENTORS.
CONRAD L. LEBLANC
and JACK BLOCH

United States Patent Office 3,531,188
Patented Sept. 29, 1970

3,531,188
FLIP-UP LENSES FOR SPECTACLES
Conrad L. Leblanc and Jack Bloch, Leominster, Mass., assignors to Foster Grant Co., Inc., Leominster, Mass., a corporation of Delaware
Continuation-in-part of application Ser. No. 527,008, Feb. 14, 1966. This application May 31, 1968, Ser. No. 723,643
Int. Cl. G02c 9/04
U.S. Cl. 351—48
4 Claims

ABSTRACT OF THE DISCLOSURE

Spectacle lenses of either the regular or clip-on type in which the lenses are pivotable at the top from the normal position in front of the eyes, to a position out of the line of sight, simply by flipping the lenses upwardly. The bridge joining the lenses is biased against a support member by a metal spring clip which coacts with the support member and bridge to maintain the lenses in the selected position.

---

This is a continuation in part of our copending application Ser. No. 527,008 filed Feb. 14, 1966, now abandoned. This invention relates to spectacles or the like, and more particularly to flip-up lenses which may be either an attachment to regular spectacles or a separate assembly mounted on its own frame, the lenses of which may be pivoted up out of the line of vision of the wearer when not in use.

It is an object of this invention to provide a flip-up, clip-on attachment for spectacles which is simple to manufacture and assemble; is releasably but firmly held in covering or non-covering position relative to the spectacles to which it is attached, and is formed from a minimum number of parts.

It is a further object of this invention to provide a flip-up, clip-on sunglass attachment for spectacles whereby the lens portion of the attachment can be pivoted up to a non-covering, substantially horizontal position relative to the lenses of the spectacle frame when not in use; and which is releasably but firmly held in covering or non-covering position relative to the spectacle frame to which it is attached.

Still another object of this invention is to provide a flip-up, clip-on sunglass attachment which consists of two molded parts pivotally joined by a metal spring clip which also serves to releasably but firmly lock the attachment in its upper inoperative position.

A further object of this invention is to provide flip-up lenses for spectacles which are pivotally mounted at their tops to a regular frame.

Other objects and features of the invention will become apparent by reference to the following specification and drawings.

The invention comprises flip-up lenses for spectacles adapted to cover the eyes or, if the clip-on type, at least a part of the spectacle lenses, and a support about which the lens portion is pivotable. A spring clip means is provided for operatively connecting the lens portion and the support. The spring clip cooperates with cam lobes on the support means to releasably lock the lens portion in a non-covering position relative to the spectacle frame front.

The presently preferred embodiment of the invention is set forth below, reference being had to the drawings in which:

FIG. 1 is a rear perspective view showing the sunglass attachment of the present invention.

FIG. 2 is a sectional view of the sunglass attachment taken along line 2—2 of FIG. 1. The spectacle frame to which it would be attached is shown in phantom.

FIG. 3 is a sectional view similar to FIG. 2 showing the sunglass attachment in raised inoperative position.

FIG. 4 is a front perspective view of a pair of eyeglasses illustrating another embodiment of this invention, on which the flip-up lens portion is pivotally mounted.

FIG. 5 is a section view taken generally along the line 5—5 of FIG. 4.

Referring to FIG. 1, the attachment 5 comprises lens portion 7 including lens 7a, 7b and a support member 9 adapted to operatively connect the attachment to a spectacle frame. The lens portion 7 is pivotally joined to support member 9 by a metal spring clip 11.

The attachment 5 is removably affixed to a spectacle frame front 13 (shown in phantom in FIGS. 2 and 3) by the resilient clamping fingers 15. The support member 9 also includes a cam member 17 which serves the function of providing a pivotal support for lens portion 7 via metal spring clip 11. The cam member 17 preferably has cam lobes 19 and 21 adapted to coact with detent 23 in metal spring clip and detent 24 on the bridge 25 of attachment 5.

The lenses 7a and 7b are joined by a bridge 25. The parts are assembled by slipping the preformed spring 11 around cam 17 so that the end 11b of the spring clip rotatably engages the cam 17. Subsequently the end 11a of spring clip 11 is slipped over the bridge 25 and locked in position with respect to the bridge. The clip 11 is preferably made of spring steel so as to permit it to be flexed and thereafter return to its original shape. The support 9 and lens portion 7 are preferably each molded as integral pieces from thermoplastic polymeric material. However, other material having similar characteristics could also be used.

As seen in FIG. 2, the cam lobe 19 coacts with detent 23, and lobe 21 coacts with detent 24 to resiliently lock the lens portion 7 in the operative position where it covers the lenses of the spectacles.

FIG. 3 shows the attachment in its upper, inoperative position. The attachment is firmly maintained in this position due to the cam lobe 19 being lodged at the junction 27 between bridge 25 and the top of spring 11, and the cam lobe 21 being lodged in corner 29 of spring 11.

Referring to FIGS. 4 and 5, a different embodiment of the invention is shown in which frame member 40 is provided with temple pieces 42 and 44 and nose bridge 46. Directly above nose bridge 46 a bracket 48, which may be integral with frame member 40, is provided for supporting flip-up lens portion 50. Nose bridge 46 includes downwardly extending portions 52 and 54, and bracket 48 at or near the top of the frame, about which the lens portion 50 pivots in moving from its position in front of the eyes to a position in which the line of sight of a wearer is not appreciably obstructed. This embodiment, of course, differs from the one shown in FIGS. 1, 2 and 3 in that the lens portion 50 does not clip on a regular pair of spectacles. The lens portion 50 is permanently mounted on a frame member for pivotal movement into and out of use, as shown best in FIG. 5, where the lens portion 50 shown in full lines is in the "in use" position, while FIG. 4 illustrates the lens portion 50 in the "out of use" position. In FIG. 5, the position of the lens portion 50 shown in phantom lines illustrates an intermediate point in the pivotal movement from the "in use" and "out of use" positions.

In the embodiment shown in FIGS. 4 and 5, a mechanism is provided for allowing pivotal movement of the lens portion 50 similar to that shown in FIGS. 1, 2 and 3. However, in this case, instead of pivoting about a support member having resilient clamping fingers for applying over the lenses of ordinary spectacles, the lens portion 50 actually pivots about a part of the frame to which it is permanently secured. This part of the frame is herein referred to as bracket 48 which also serves as a cam. It is provided with lobes 56 and 58 which communicate with connecting bar 60 to which the individual lenses 62 and 64 are secured. Connecting bar 60 is provided with detent 66 which rides the cam of bracket 48, and is held in firm engagement therewith by spring clip 70. Lobes 56 and 58 are located on bracket 48 such that connecting bar 60, hence, lens portion 50, stop in both the "in use" and "out of use" positions. It will thus be seen that bracket 48 acts in generally the same manner as the support member of the clip-on style.

The frame member 40 of this embodiment of the invention is conveniently only a partial frame. It will be noted from the drawings that lower and outside portions have been omitted. This is desirable because less vision is obstructed, and easy access is rendered to the lens portion 50 for flipping up.

The lens portion 7 of FIGS. 1, 2 and 3, and portion 50 of FIGS. 4 and 5 may comprise sunglass type and/or opthalmic type lenses, or may also comprise any other type of eye shielding or shading members.

From the above, it is seen that a sunglass attachment for spectacles has been provided which is simple to manufacture and assemble; and which can be pivoted up out of the line of vision of the wearer when not in use, and is releasably but firmly locked in the inoperative position whereby the lenses are effectively prevented from dropping down into the line of vision of the wearer.

While an exemplary embodiment of the invention has been set forth in detail, the foregoing description is to be considered exemplary rather than limiting; and the scope of the invention is to be determined from the appended claims.

What is claimed is:
1. A flip-up lens device comprising:
 (a) a lens portion comprising two lenses connected by a bridge;
 (b) a support member for supporting said device in front of the eyes of a wearer, said support member comprising a cam member having at least one lobe thereon;
 (c) a metal spring clip substantially surrounding said bridge and said cam member to pivotally join said lens portion and said support member;
 (d) said metal spring clip comprising a preformed separate integral metal member having a detent therein and being adapted to coact with at least one lobe of said cam and urge said cam member into contact with said bridge;
 (e) said spring clip being substantially fixed relative to said bridge and rotatable with respect to said cam;
 (f) whereby the lens portion is normally firmly but movably maintained in an operative position relative to said line of vision of the wearer by coaction of said detent with said cam lobe but may be moved upwardly into a substantially horizontal non-operable position by pivoting said lens portion relative to said cam;
 (g) and the lens portion is firmly but movably maintained in said non-operable position by coaction of the cam with the spring clip and bridge.

2. The flip-up lens device of claim 1 wherein said bridge has a detent therein and said cam member has a plurality of lobes, at least one of said lobes coacting with said detent in said bridge to aid in maintaining said lens portion in its operable position relative to the line of vision of the wearer.

3. The device as described in claim 2 wherein said support member includes a plurality of flexible clamps for attaching said device to a pair of spectacles.

4. The device as described in claim 2, wherein said support member includes:
 a frame portion, and
 a pair of temple pieces connected to said frame portion.

References Cited
UNITED STATES PATENTS

| | | | |
|---|---|---|---|
| 2,986,970 | 6/1961 | Kilgour et al. | 351—59 |
| 3,383,707 | 5/1968 | McNeill | 351—59 |
| 3,413,057 | 11/1968 | Carmichael | 351—47 |

FOREIGN PATENTS

| | | |
|---|---|---|
| 461,279 | 11/1949 | Canada. |
| 151,981 | 12/1937 | Austria. |

DAVID SCHONBERG, Primary Examiner

J. W. LEONARD, Assistant Examiner

U.S. Cl. X.R.
351—58, 59; 2—14